United States Patent
Soules

(10) Patent No.: US 9,771,043 B2
(45) Date of Patent: Sep. 26, 2017

(54) SAFETY NET FOR VEHICLES

(71) Applicant: Jack Soules, Las Cruces, NM (US)

(72) Inventor: Jack Soules, Las Cruces, NM (US)

(*) Notice: Subject to any disclaimer, the term of this patent is extended or adjusted under 35 U.S.C. 154(b) by 0 days.

(21) Appl. No.: 14/993,338

(22) Filed: Jan. 12, 2016

(65) Prior Publication Data
US 2017/0197575 A1    Jul. 13, 2017

(51) Int. Cl.
| | |
|---|---|
| *B60R 21/08* | (2006.01) |
| *B60R 21/214* | (2011.01) |
| *B60R 21/0132* | (2006.01) |
| *B60R 21/02* | (2006.01) |
| *B60R 21/00* | (2006.01) |
| *B60R 21/01* | (2006.01) |

(52) U.S. Cl.
CPC .......... *B60R 21/08* (2013.01); *B60R 21/0132* (2013.01); *B60R 21/214* (2013.01); *B60R 2021/0067* (2013.01); *B60R 2021/01034* (2013.01); *B60R 2021/0273* (2013.01)

(58) Field of Classification Search
CPC ..... B60R 21/0132; B60R 21/06; B60R 21/08; B60R 21/214; B60R 2021/0067; B60R 2021/009; B60R 2021/0097; B60R 2021/01034; B60R 2021/01325; B60R 2021/0273; B60R 2021/0293
See application file for complete search history.

(56) References Cited

U.S. PATENT DOCUMENTS

| | | | | |
|---|---|---|---|---|
| 2,025,822 A | * | 12/1935 | Pryor | B60R 21/08 280/749 |
| 3,169,781 A | | 2/1965 | Abruzzino | |
| 3,443,824 A | * | 5/1969 | Dietrich | B60R 21/06 244/122 R |
| 3,643,972 A | * | 2/1972 | Caiati | B60R 21/06 280/749 |
| 3,650,542 A | * | 3/1972 | Shimano | B60R 21/08 280/749 |
| 3,687,485 A | * | 8/1972 | Campbell | B60R 21/08 280/733 |
| 3,692,327 A | * | 9/1972 | Barrick, Sr. | B60R 21/08 280/749 |
| 3,695,629 A | * | 10/1972 | Schlanger | B60R 19/02 180/274 |
| 3,782,756 A | * | 1/1974 | Brown | B60R 21/08 280/749 |

(Continued)

FOREIGN PATENT DOCUMENTS

WO    2009041864 A1    4/2009

OTHER PUBLICATIONS

SAFERACER Window Nets, http://www.saferacer.com/auto-racing-restraints/window-nets, printed Jan. 12, 2016, 2 pages.

*Primary Examiner* — Laura Freedman
(74) *Attorney, Agent, or Firm* — Kevin Soules; Kermit D. Lopez; Luis M. Ortiz

(57) ABSTRACT

A vehicle safety system method and apparatus comprises at least one cupboard formed in a ceiling of a vehicle, at least one net stored in the cupboard, at least one detection module configured to identify a state requiring deployment of the net; and at least one deployment module configured to deploy the at least one net when the state requiring deployment of the net is positive.

20 Claims, 9 Drawing Sheets

(56) References Cited

U.S. PATENT DOCUMENTS

| | | | |
|---|---|---|---|
| 3,795,412 A * | 3/1974 | John | B60R 21/08 |
| | | | 180/274 |
| 3,831,975 A | 8/1974 | Mednikow | |
| 3,836,168 A | 9/1974 | Nonaka et al. | |
| 3,837,670 A * | 9/1974 | Hilyard | B60R 21/02 |
| | | | 280/753 |
| 4,569,534 A * | 2/1986 | Nalbandyan | B60N 2/4221 |
| | | | 180/274 |
| 4,659,110 A | 4/1987 | Polk | |
| 4,906,020 A * | 3/1990 | Haberer | B60R 21/08 |
| | | | 180/274 |
| 5,011,182 A * | 4/1991 | Husby | G01P 15/135 |
| | | | 180/282 |
| 5,226,672 A | 7/1993 | Husted | |
| 5,433,477 A * | 7/1995 | Kraus | B60R 21/08 |
| | | | 280/749 |
| 5,437,474 A | 8/1995 | Ament | |
| 5,547,219 A * | 8/1996 | Ha | B60R 21/08 |
| | | | 180/274 |
| 5,660,414 A | 8/1997 | Karlow et al. | |
| 5,857,701 A * | 1/1999 | Nanda | B60R 21/08 |
| | | | 280/749 |
| 6,502,859 B1 | 1/2003 | Svetlik | |
| 7,303,209 B2 | 12/2007 | Kwok | |
| 2004/0212217 A1 | 10/2004 | Cacucci et al. | |
| 2015/0021955 A1 | 1/2015 | Szewczyk et al. | |

* cited by examiner

SAFETY NET FOR VEHICLES

TECHNICAL FIELD

Embodiments are generally related to the field of vehicle safety. In particular, the embodiments are related to deployable safety nets in vehicles. The embodiments are further related to methods and systems for preventing unrestrained objects or people from attaining an unsafe speed before colliding with passengers.

BACKGROUND

Vehicles for transporting passengers have become ubiquitous in modern society. Although vehicles provide unparalleled levels of convenience, efficiency, and freedom, safety concerns are among the most serious drawbacks. For example, seat belts have become a very common means of restraining passengers in the event of a collision or unexpected force. However, most forms of public transportation do not provide seat belts for passengers, and many motorists choose not to take advantage of seat belts even when they are available.

All types of vehicles including personal vehicles, public transportation vehicles, trains, etc., are frequently involved in accidents where the vehicle may tumble or roll. When the vehicle is upset, every passenger, as well as every package, suitcase, backpack, computer, etc., becomes a potentially lethal projectile, flying at high speed through the vehicle. Seat belts, which are meant to restrain passengers, do not prevent collisions between these flying objects. In addition, prior art solutions generally do not provide adequate netting to prevent such flying objects from becoming lethal projectiles.

Given the popularity of various transportation means all of which are subject to collisions, a need exists for improved methods and systems for preventing or mitigating the danger of contact between objects during a collision.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide methods, systems, and apparatuses for vehicle safety.

It is another aspect of the disclosed embodiments to provide a net system in a vehicle.

It is another aspect of the disclosed embodiments to prevent loose objects and passengers in a vehicle from colliding.

It is yet another aspect of the disclosed embodiments to provide a safety net system in a vehicle that deploys nets upon detection of an acceleration in order to prevent objects and passengers from colliding as a result of the acceleration.

The aforementioned aspects and other objectives and advantages can now be achieved as described herein. For example, a vehicle safety system comprises at least one cupboard formed in a ceiling of a vehicle, at least one net stored in the cupboard, at least one detection module configured to identify a state requiring deployment of the net, and at least one deployment module configured to deploy the at least one net when the state requiring deployment of the net is positive. The at least one weight can be attached to each of the at least one net. At least one explosive charge can be affixed to each of the at least one net. The at least one net comprises a plurality of nets; the plurality of nets arranged in a plurality of cupboards wherein the plurality of cupboards is configured in the ceiling of the vehicle such that the deployment of the plurality of nets separates each of at least one seat in the vehicle from every other of the at least one seat in the vehicle. The plurality of cupboards is configured in the ceiling of the vehicle such that the deployment of the plurality of nets creates a passable aisle to an exit of the vehicle. The vehicle can comprise at least one of a car, a truck, a bus, a school bus, a public transit bus, a train, a trolley, and a subway car. The detection module can comprise a ball and pocket accelerometer operably connected to a yes/no switch, and a trigger configured to trigger deployment via the deployment module.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The particular values and configurations discussed in the following non-limiting examples can be varied and are cited merely to illustrate one or more embodiments and are not intended to limit the scope thereof.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
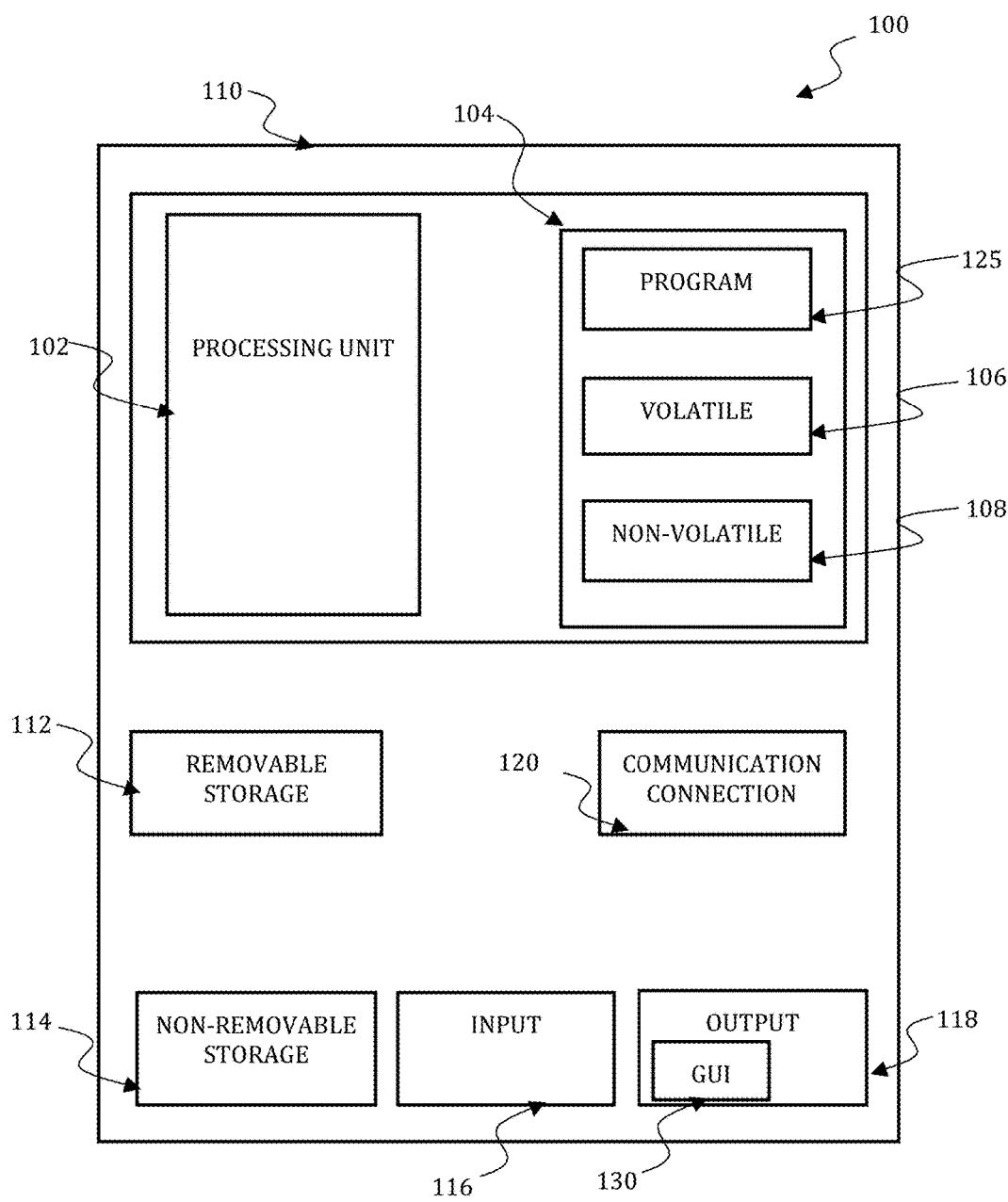
FIG. 1 depicts a block diagram of a computer system which is implemented in accordance with the disclosed embodiments.
Figure 2:
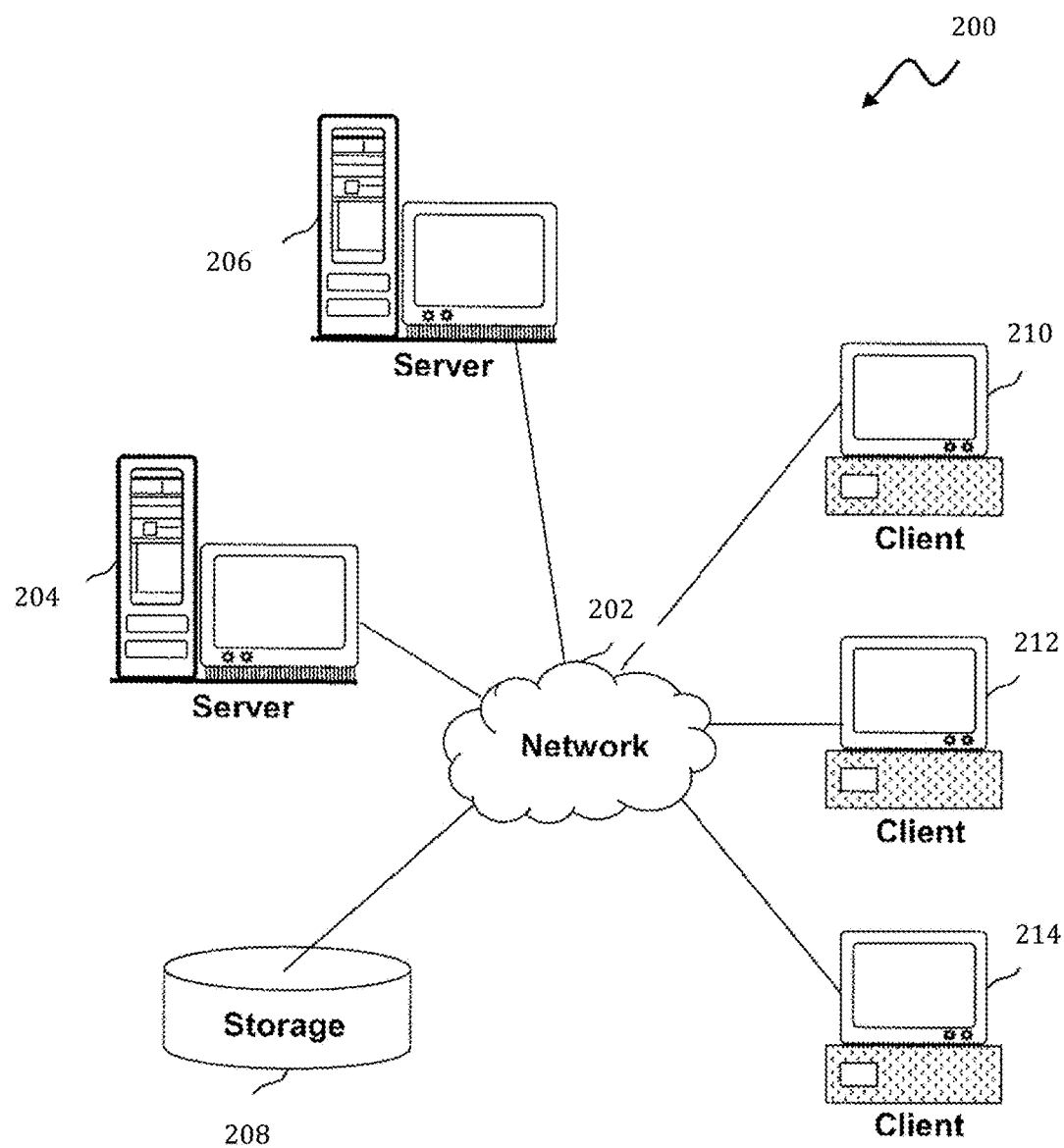
FIG. 2 depicts a graphical representation of a network of data-processing devices in accordance with the disclosed embodiments.
Figure 3:
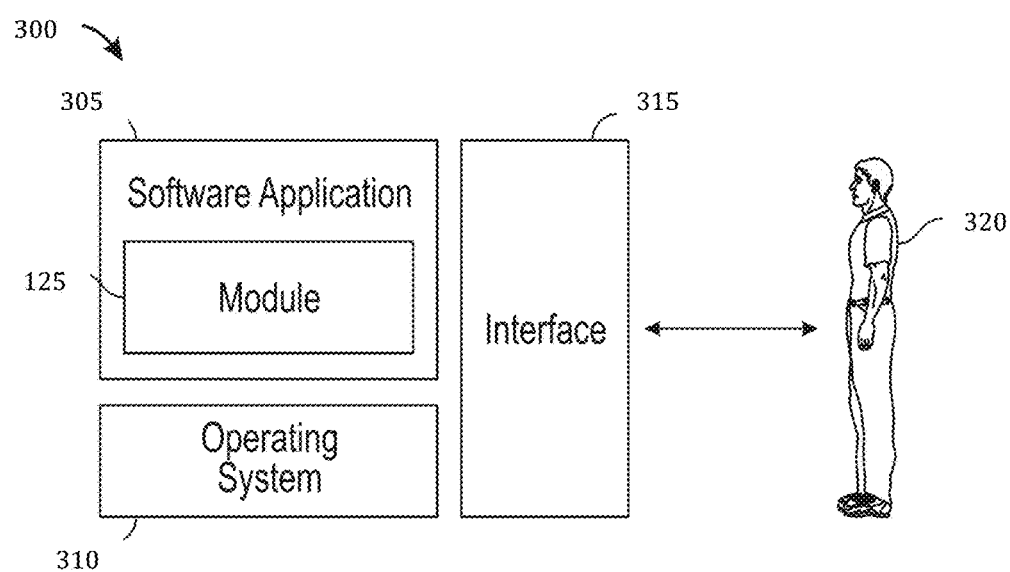
FIG. 3 depicts a computer software system for directing the operation of the data-processing system depicted in FIG. 1, in accordance with the disclosed embodiments.

FIGS. 1-3 are provided as exemplary diagrams of data-processing environments in which aspects of the embodiments may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is shown in FIG. 1. A computing device in the form of a computer 110 configured to interface with sensors, mechanical devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 110 may include or have access to a computing environment that includes input 116, output 118, and a communication connection 120. The computer may operate in a networked environment using a communication connection 120 to connect to one or more remote computers, hand-held devices, mobile devices, mobile phones, Smartphones, external mechanical devices, sensors, accelerometers, or other such devices. The remote computer may also include a personal computer (PC), server, router, network PC, a peer device or other common network node, or the like. The communication connection may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive. CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers or other such devices such as mobile phones, Smartphones, tablet devices, mechanical devices, sensors, accelerometers, and the like in which embodiments of the present invention may be implemented. Note that the system 200 can be implemented in the context of a software module such as program module 125. The system 200 includes a network 202 in communication with one or more clients 210, 212, and/or 214. Network 202 may also be in communication with one or more servers 204 and 206, and storage 208. Network 202 is a medium that can be used to provide communications links between various devices and computers connected together within a networked data processing system such as computer system 100. Network 202 may include connections such as wired communication links, wireless communication links of various types, and fiber optic cables. Network 202 can communicate with one or more servers 204 and 206, one or more external devices such as sensors, mobile devices, mechanical devices, and/or a memory storage unit such as, for example, memory or database 208.

In the depicted example, servers 204 and 206, and clients 210, 212, and 214 connect to network 202 along with storage unit 208. Clients 210, 212, and 214 may be, for example, personal computers or network computers, handheld devices, mobile devices, tablet devices, Smartphones, personal digital assistants, sensors, accelerometers, mechanical devices, etc. Computer system 100 depicted in FIG. 1 can be, for example, a client such as client 210 and/or 212.

Computer system 100 can also be implemented as a server such as server 206 depending upon design considerations. In the depicted example, server 206 provides data such as boot files, operating system images, applications, and application updates to clients 210, 212, and/or 214. Clients 210, 212, and 214 can be clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 114 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, mobile phones, Smartphones, tablet devices multi-processor systems, data networks, microprocessor-based or programmable consumer electronics, networked personal computers, minicomputers, mainframe computers, servers, and the like.

Note that the term module or node as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface can serve to display results, whereupon a user 320 may supply additional inputs or terminate a particular session. In some embodiments, operating system 310 and GUI 315 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to certain aspects of embodiments of the present invention, which can be embodied in the context of or require the use of a data-processing system such as computer system 100, in conjunction with program module 125, and data-processing system 200 and network 202 depicted in FIGS. 1-2. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, and the like. Therefore, the descriptions of the exemplary embodiments, which follow, are for purposes of illustration and not considered a limitation.

The methods and systems disclosed herein use netting to prevent dangerous interactions between objects in a vehicle during a collision. School buses, commercial buses, trains, and other passenger vehicles are frequently involved in accidents where the vehicle may tumble or roll. In the event of a traffic accident, every passenger, as, well as every package, suitcase, backpack, computer, and the like becomes a potentially lethal projectile, flying at high speed through the vehicle. The embodiments disclosed herein prevent such unrestrained objects or people from reaching a speed of more than a few feet per second before colliding with a lightweight net. The net can take the kinetic energy from the missile and ensnare it harmlessly. After the acceleration has stopped, the passengers can push the nets aside and exit the vehicle through any door or window. Even a torn net can make a contribution to safety by taking energy from any flying objects. The nets can be launched by small explosive charges directing them across the open areas of the vehicle regardless of the direction of gravity. The nets can be stored in the overhead space of the vehicle and released only when a sensor detects a large acceleration.

Figure 4:
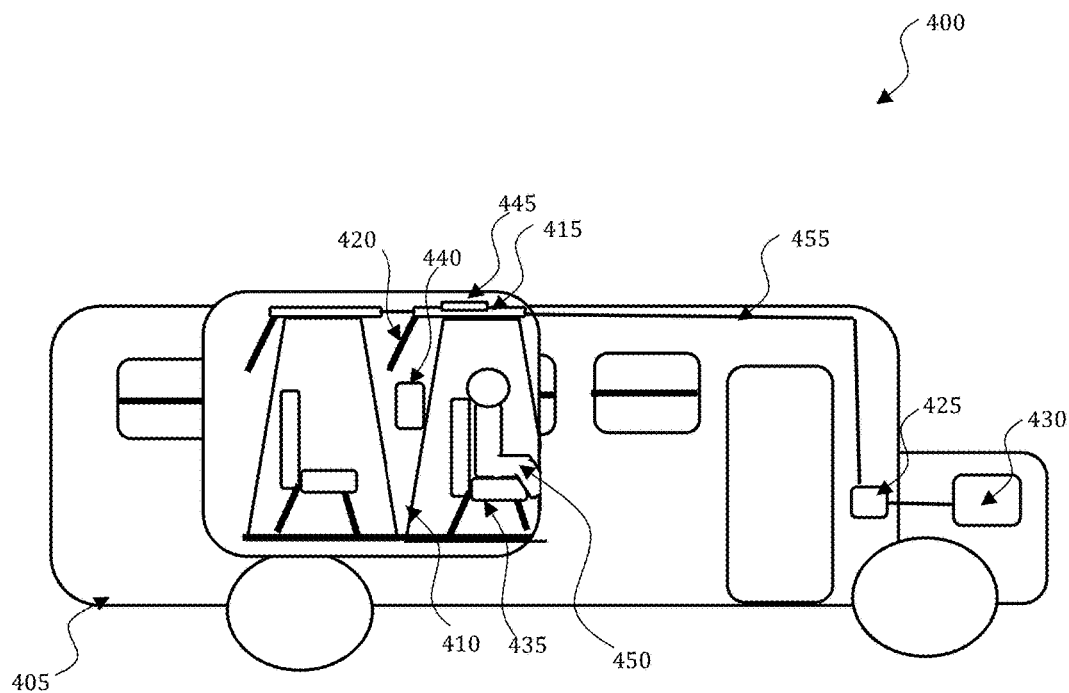
FIG. 4 depicts a safety net system in accordance with the disclosed embodiments.

FIG. 4 illustrates one embodiment of a system 400 for deploying safety nets in a vehicle 405. It should be appreciated that although FIG. 4 illustrates vehicle 405 as a bus, the vehicle 405 may also be embodied as a car, a truck, a school bus, a public transit bus, a train, a trolley, a subway car, or other such vehicle.

The vehicle 405 includes at least one and likely several seats 435. A detection module 425 can be used to detect an acceleration indicative of an accident. The detection module can generally include an accelerometer, switches, and/or a computer such as computer system 110 with computer hardware and software such that the acceleration is detected by the detection module. The detection module 425 can be powered by a power module 430. In a preferred embodiment, the power module 430 is the vehicle 405 battery. However, power module 430 may alternatively be any power source either associated with or independent of vehicle 405. The power module 430 may be a battery integrated in the detection module 425.

The detection module 425 is operably connected to a deployment module 445 via connection 455. Connection 455 between the detection module 425 and deployment module 445 can be achieved through standard wired connections. Alternatively, the connection 455 between detection module 425 and deployment module 445 can be via wireless communication such as onboard Bluetooth, network connections, cellular networks, Bluetooth low energy, near filed communications, and the like. The deployment module 445 is generally configured to receive a signal from the detection module 425 and trigger the release of nets such as net 410.

Nets, such as net 410, are contained in a cupboard 415 installed in the ceiling of the vehicle 405. In one embodiment, the cupboard 415 is molded into the ceiling of the vehicle 405 when the ceiling is manufactured. In another embodiment, the cupboard 415, along with the remaining parts of system 400, can be installed in the vehicle 405 as aftermarket parts, in order to retrofit vehicle 405 with the system 400.

The cupboard 415 includes a releasable door 420. Upon identification of a collision, detection module 425 can notify deployment module 445. Deployment module 445 then triggers the automatic release of releasable door 420. When releasable door 420 is open, net 410 can be deployed around seat 435. Net 410 can be embodied as one or more nets that surround or otherwise enclose seat 435. Net 410 can prevent flying objects such as object 440 from achieving sufficient kinetic energy to be dangerous to passengers, such as passenger 450.

Figure 5:
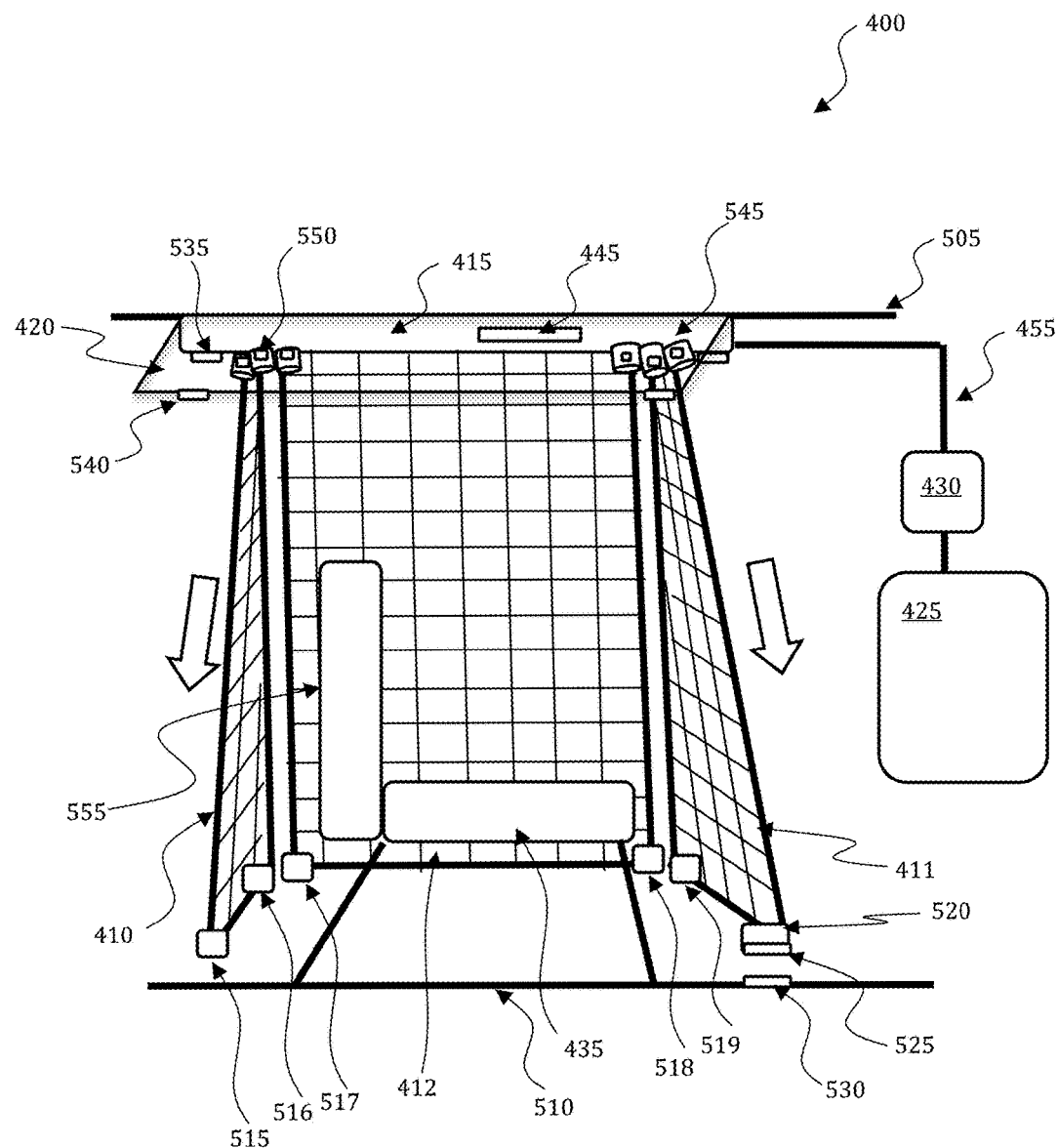
FIG. 5 depicts a safety net system being deployed in a vehicle in accordance with the disclosed embodiments.

FIG. 5 provides a more detailed view of a vehicle safety system 400 in accordance with the embodiments herein. As above, detection module 425 is connected to power module 430 and deployment module 445. Deployment module 445 can trigger the automatic release of latch 535 from latch fitting 540 in order to automatically open releasable door 420. FIG. 5 further illustrates net 410, net 411, and net 412. Each of nets 410, 411, and 412 are illustrated in the process of being deployed, as the nets 410, 411, and 412 have not yet made contact with the floor 510 of the vehicle.

As a vehicle rolls or tumbles, the orientation of the cupboard 415 changes. For example, if the vehicle were upside down, the ceiling 505 of the vehicle and the cupboard's 415 opening would be facing upward. In this circumstance, the force of gravity would hold nets 410, 411, and 412 in the cupboard without some applied force. The nets 410, 411, and 412 are therefore connected to a small explosive charge, such as charge 550 held in cabinet 415.

The charge 550 can be aimed along a chosen trajectory. The trajectory can be adjusted by aiming charge tubes, such as charge tube 545. It should be appreciated that any number of charges and charge tubes may be provided. When deployment module 445 receives a signal indicating a collision, the deployment module can set off charges such as charge 550. The charges propel the nets. Power module 430 may supply the power needed to detonate charge 550. Alternatively or additionally, compressed springs can be connected to nets 410, 411, and 412 for propulsion. The deployment module can be configured to detonate charge 550 such that the nets 410, 411, and 412 are deployed within 0.2 seconds of the collision detection.

In one embodiment, the nets can be configured to include small weights. For example, net 410 includes weight 515 and weight 516, net 412 includes weight 517 and weight 518, and net 411 includes weight 519 and weight 520. The weights can be affixed to the nets, preferably on each corner of the net. The weights 515-520 are the first article to leave cupboard 415. The weights may be arranged in the charge tubes such as charge tube 545. Thus, on detonation of the charge 550, the weight is propelled into position. The weights 515-520 can be any size, but are preferably one pound or less.

The weights 515-520 prevent deceleration of the nets 410, 411, and 412 in transit to their desired positions. The nets are light weight, preferably one pound or less. Nets 410, 411, and 412 are intentionally formed from lightweight material such as nylon cord, twine, rope, or other such material, so that the nets can be easily moved once the vehicle has stopped, allowing passengers to escape the vehicle.

The nets 410, 411, and 412 can further be configured to include at least one fastening member such as fastening member 525. The fastening member 525 has a matching fastener 530 so that when fastening member 525 contacts fastener 530 they cling to one another. Any number of fastening members and fasteners may be provided.

For example, in one embodiment, fastening member 525 and fastener 530 comprise a hook and loop fastener. Fastening member 525 can be formed on the weights such as weight 520. Charge tube 545 can be arranged to propel weight 520 and fastening member 525 toward fastener 530 which can be, for example, installed on the floor 510 of the vehicle, on the seat 435, or on the seat back 555. Upon impact, the connection between fastening member 525 and fastener 530 lightly holds the nets such as net 411 in place. The connection between fastening member 525 and fastener 530 is sufficiently weak to allow passengers to easily break the connection in their effort to escape the vehicle.

Figure 6:
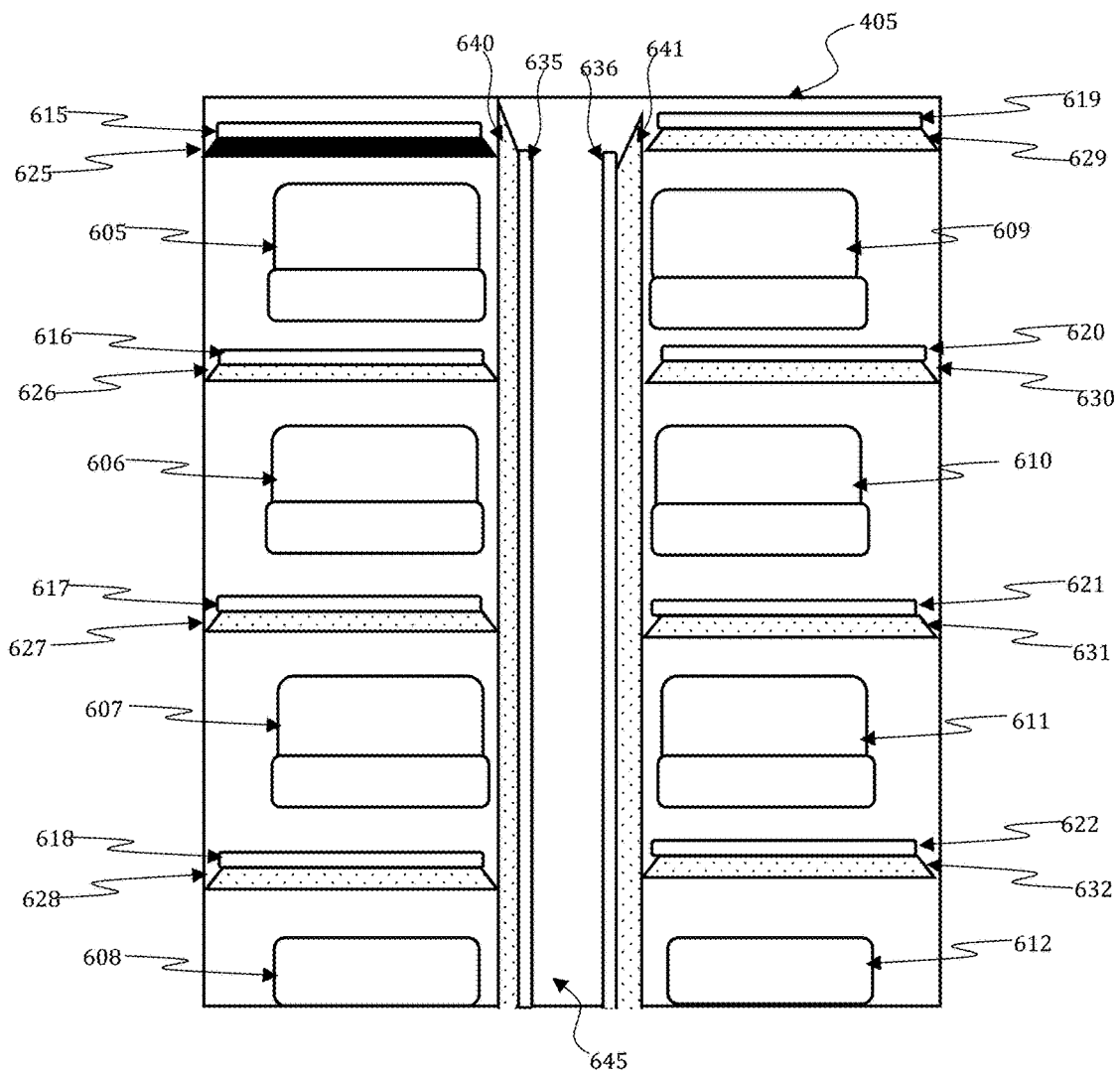
FIG. 6 depicts an arrangement of a safety net system in a vehicle in accordance with the disclosed embodiments.

FIG. 6 is provided to illustrate an exemplary arrangement of system 400 in a vehicle 405. The vehicle 405 can contain a plurality of seats 605-612. It should be understood that any number of seats may be included in vehicle 405 and seats 605-612 are exemplary. Vehicle 405 may include a plurality of lateral cabinets 615-622. It should be appreciated that each of lateral cabinets 615-622 may include the elements illustrated in FIGS. 1-5. In particular each of lateral cabinets 615-622 includes nets 625-632, respectively. This arrangement of nets, as shown in FIG. 6, isolates each of seats 605-612 from each other.

Additionally, the length of the vehicle can include cabinets 635 for deploying net 640 and cabinet 636 for deploying net 641. Nets 640 and 641 prevent objects or passengers from traversing the center of the vehicle and colliding. However, nets 640 and 641 further define a vacant corridor 645 along the center aisle of the vehicle. This is important because it provides an unobstructed path for passengers to use to exit the vehicle after the nets have been deployed. It should be understood that the cabinets may be alternatively arranged such that the deployed nets provide an exit path, even where the arrangement of seats creates an aisle that is not along the center of the vehicle, or is asymmetrical.

It should be appreciated that the nets and cabinets illustrated in FIG. 6 may be connected to a single detection module such as detection module 425 or each cabinet may have its own detection module. Similarly, each of the cabinets may be connected to a single deployment module 445 or may have its own deployment module. Each cabinet may deploy one or more nets.

Figure 7:
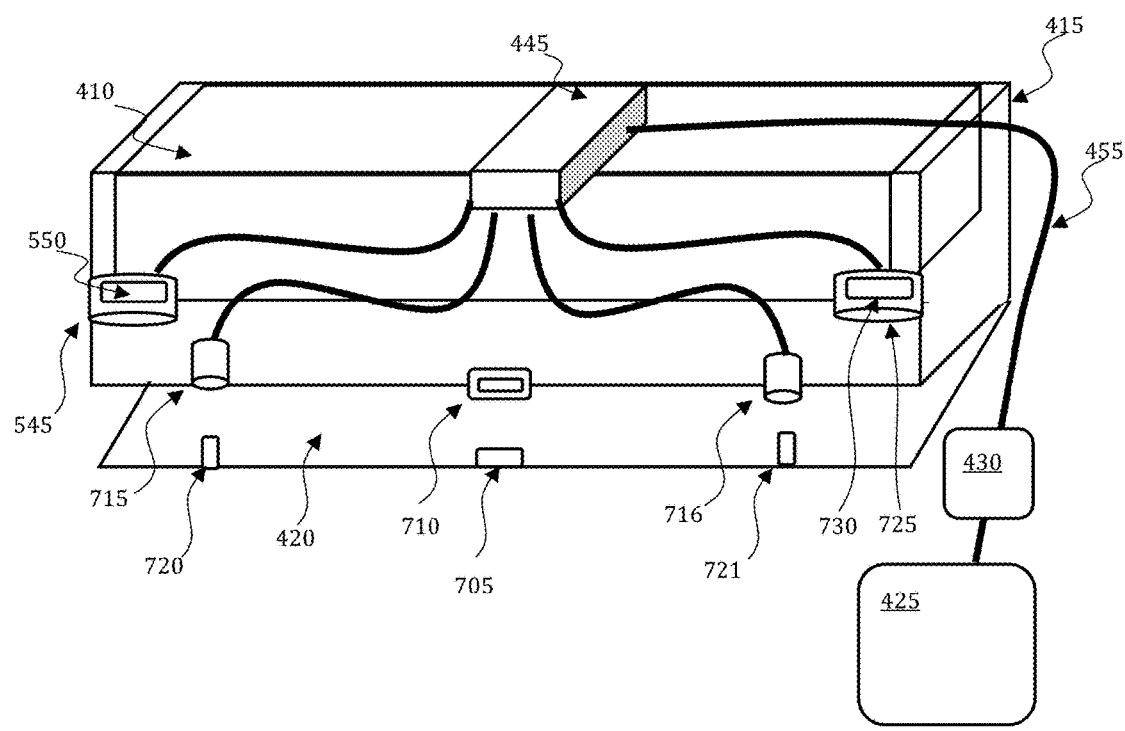
FIG. 7 depicts a block diagram of a safety net cupboard in accordance with the disclosed embodiments.

FIG. 7 provides a more detailed illustration of a cabinet, such as cabinet 415 in accordance with an embodiment of the invention. The cabinet 415 can be formed of molded plastic, wood, fiberglass, metal, or other such lightweight material. The cabinet 415 can hold the compacted, un-deployed net 410. The top corners of the net 410 can be fastened to or otherwise connected to the ceiling of cabinet 415. The bottom corners of the net 410 can be connected to weights (not shown) held in charge tubes 545 and 725. Charges 550 and 730 are configured to eject the weights in a desired direction upon the detection of an acceleration indicative of a crash provided by the detection module 425.

The cabinet 415 has releasable door 420. In FIG. 7, the releasable door 420 is illustrated as ajar for purposes of illustration. Releasable door 420 is held closed prior to the detection of a collision, using a releasable latch such as releasable latch 715 and releasable latch 716. In one embodiment, the releasable latches 715 and 716 can be solenoids, and latch fittings 720 and 7211 can be magnetic rods. Upon detection of a crash by detection module 425, a current can be removed from solenoids 715 and 716 thereby shutting off the magnetic force holding latching fitting 720 and 721. This releases the releasable door 420. Other known latching mechanisms may alternatively be used, provided such mechanisms are capable of automatically releasing after being provided a signal from deployment module 445.

Releasable door 420 may also include a service latch 710 and service latch fitting 705. The service latch can be manually operated by a service technician in order to open releasable door 420 in the event the system requires service. The releasable door 420 can be spring loaded to ensure the door is sufficiently open for net deployment.

Figure 8:
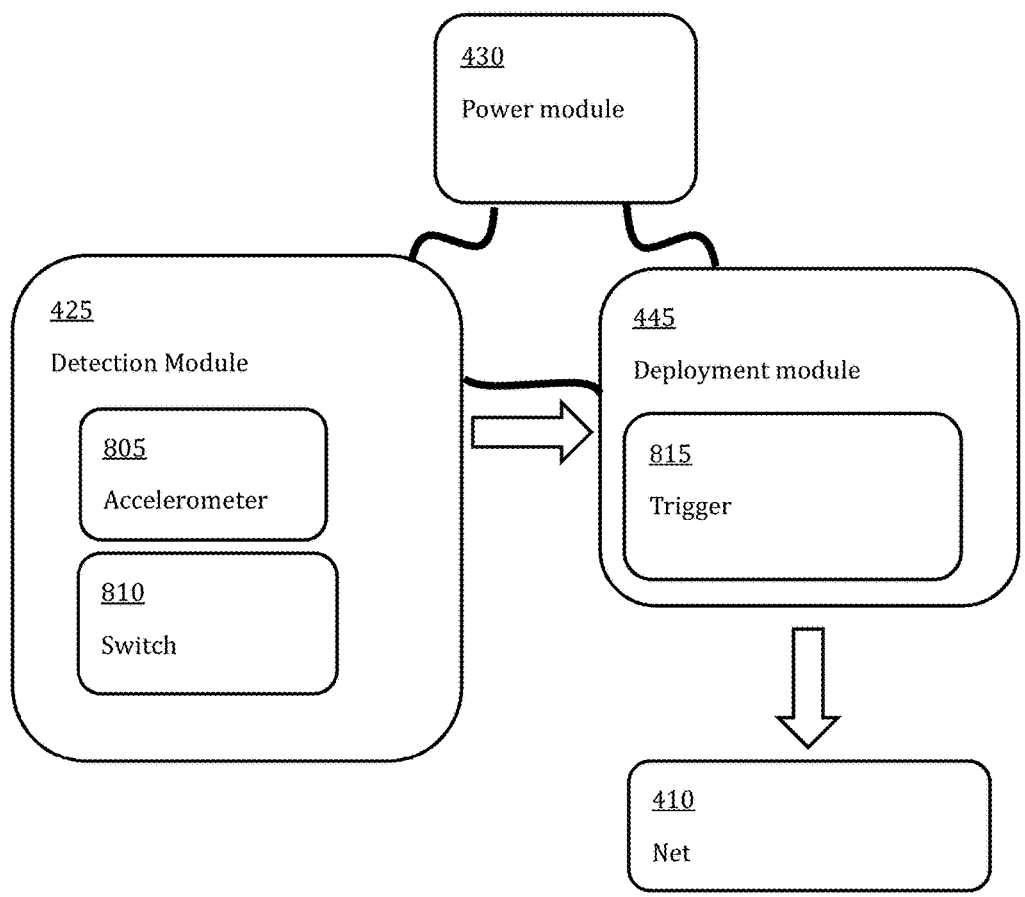
FIG. 8 depicts a block diagram of a detection and deployment system in accordance with the disclosed embodiments.

FIG. 8 illustrates a block diagram of a system in accordance with an embodiment of the invention. A detection module 425 can be configured to detect events that require deployment of nets to prevent collisions between flying objects and people. The detection module is preferably configured to identify accelerations between 0.5 Gs and 1 G in the horizontal direction. Vertical Axis accelerations may also be identified.

In one embodiment, the detection module 425 includes an accelerometer 805. The accelerometer 805 can be a single or multi axis accelerometer. The accelerometer may be a ball and pocket accelerometer. In other embodiments, the accelerometer may be piezoelectric, piezoresistive, or capacitive accelerometer. In still other embodiments, the accelerometer may be a micro electro-mechanical (MEMS) device comprising a cantilever beam and proof mass design. In some embodiments, the accelerometer 805 may be formed as a component in a computing device such as computer system 100, or may be a stand-alone device. In some embodiments, the accelerometer 805 may be formed in cabinet 415.

Detection module 425 may comprise a circuit comprising accelerometer 805 and a yes/no switch, such as switch 810. It should be appreciated that the circuit may be embodied as hardware or software. The circuit and/or the detection module 425 can be supplied with power via power module 430. Upon detection of a pre-defined acceleration threshold in the horizontal and/or vertical direction, the yes/no switch can complete the circuit such that a signal is transmitted to the deployment module 445. Communication between the detection module and deployment nodule may be wired or can be made via wireless communication networks.

Upon receiving a signal from the detection module, a trigger 815 associated with the deployment module can provide signals that release cabinet latches, such as latch 535, and/or ignite charges such as charges 550 to deploy net 410. Power can be supplied to the deployment module via power module 430. It should once again be appreciated that the deployment module may be configured as hardware or software.

The detection module 425, deployment module 445, and power module 430 may all be integrated in a single electronic device embodied as hardware and/or software module, or may each be separate and stand alone modules embodied as hardware and/or software. Any and/or all of the modules may be formed together in each cabinet or may serve centrally such that one and/or all of the modules control detection and deployment for all of the cabinets.

Figure 9:
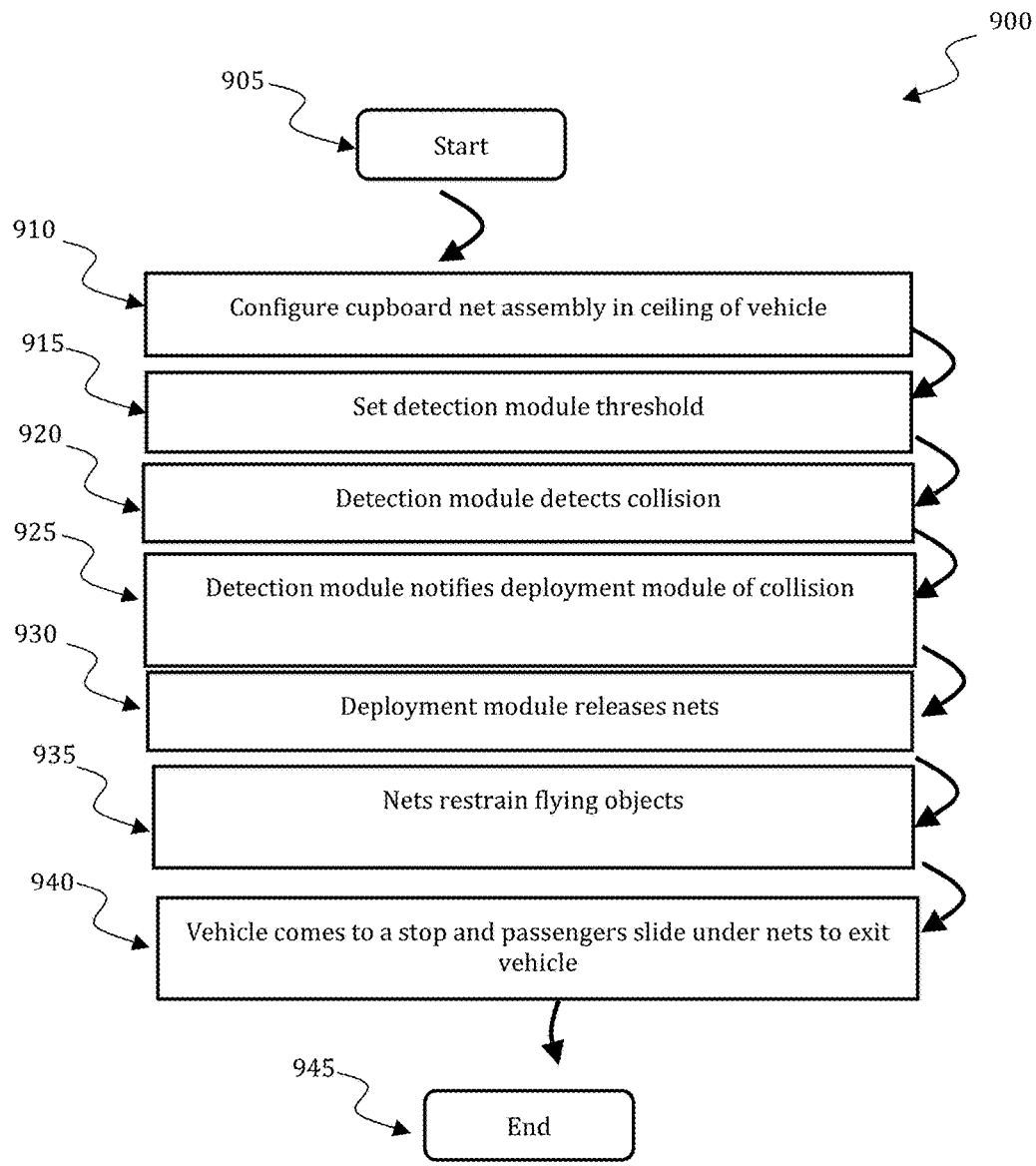
FIG. 9 depicts a flow chart of logical operational steps associated with a method for preventing collisions between flying objects in a vehicle in accordance with the disclosed embodiments.

FIG. 9 illustrates steps associated with a method 900 for preventing objects from injuring passengers in a vehicle. The method begins at step 905.

At step 910, a system for deploying safety nets such as system 400 can be installed or integrated into a vehicle. The system may be molded into the ceiling of the vehicle or may be installed as an aftermarket cupboard system. The vehicle can be any type of passenger vehicle, but is most useful in passenger vehicles where seatbelts are rarely provided or worn, such as public transit vehicles, busses, trains, etc.

The detection module may be set with a predetermined threshold as shown at step 915. The threshold may provide a minimum acceleration in the vertical direction, horizontal direction, or combination thereof, beyond which the detection module will signal release of the nets. A user, via a user interface, such as user interface 315, may modify the predetermined threshold.

The vehicle in which the system is configured can now commence normal transportation activities. The system is not deployed during typical transportation activities. It should be noted that if the system does deploy during typical transportation, for example, during a hard stop at a yellow light, the predetermined threshold can be adjusted to prevent false positive detections. This may include increasing the threshold acceleration in the horizontal direction, but not the vertical direction, or vice versa. The system may be configured to be used multiple times. In the event of an unwanted deployment, the nets can be returned to the cabinets and new charges can be installed.

In the event of a collision, or acceleration beyond the predefined threshold, the detection module detects a collision as shown at step 920. The detection module as illustrated in FIG. 8 can identify accelerations beyond the predefined threshold and complete a circuit that notifies the deployment module of the collision as shown at step 925.

When the deployment module receives the signal from the detection module, the deployment module then releases the nets as illustrated at step 930. This may include automatically releasing the cabinet doors and using spring-loaded latches to ensure the doors are sufficiently open to allow the nets to deploy. This may also include providing signals to and/or detonating the charges connected to the nets. The charges may be connected to the weights such that the detonation of the charges propels the weights (and nets) into position throughout the vehicle. The time between the initial detection and the deployment of the nets is preferably less than 0.2 seconds.

The deployed nets create individual curtains surrounding each seat or bank of seats, and prevent flying objects such as luggage, electronic devices, other passengers, etc., from colliding with one another as illustrated at step 935. Once the vehicle has reached a standstill, passengers slide the nets, which are intentionally lightweight, aside and exit the vehicle as shown at step 940. The method ends at step 945.

Based on the foregoing, it can be appreciated that a number of embodiments, preferred and alternative, are disclosed herein. For example, in one embodiment a vehicle safety system comprises at least one cupboard formed in a ceiling of a vehicle; at least one net stored in the cupboard; at least one detection module configured to identify a state requiring deployment of the net; and at least one deployment module configured to deploy the at least one net when the state requiring deployment of the net is positive.

In another embodiment, at least one weight can be attached to each of the at least one net. At least one explosive charge can be affixed to each of the at least one net.

In another embodiment, the at least one net comprises a plurality of nets, the plurality of nets arranged in a plurality of cupboards wherein the plurality of cupboards are configured in the ceiling of the vehicle such that the deployment of the plurality of nets separates each of at least one seat in the vehicle from every other of the at least one seat in the vehicle. The plurality of cupboards are configured in the ceiling of the vehicle such that the deployment of the plurality of nets creates a passable aisle to an exit of the vehicle.

In another embodiment, the vehicle comprises at least one of a car, a truck, a bus, a school bus, a public transit bus, a train, a trolley, and a subway car. In yet another embodiment, the detection module comprises a ball and pocket accelerometer operably connected to a yes/no switch, and a trigger configured to trigger deployment via the deployment module.

In another embodiment, a vehicle safety apparatus comprises at least one cupboard formed in a ceiling of a vehicle; at least one net stored in the cupboard; at least one detection module configured to identify a state requiring deployment of the net; and at least one deployment module configured to deploy the at least one net when the state requiring deployment of the net is positive.

In another embodiment, at least one weight can be attached to each of the at least one net. At least one explosive charge can be affixed to each of the at least one net.

In another embodiment, the at least one net comprises a plurality of nets, the plurality of nets arranged in a plurality of cupboards wherein the plurality of cupboards are configured in the ceiling of the vehicle such that the deployment of the plurality of nets separates each of at least one seat in the vehicle from, every other of the at least one seat in the vehicle. The plurality of cupboards are configured in the ceiling of the vehicle such that the deployment of the plurality of nets creates a passable aisle to an exit of the vehicle.

In another embodiment, the vehicle comprises at least one of a car, a truck, a bus, a school bus, a public transit bus, a train, a trolley, and a subway car.

In another embodiment, the detection module comprises a ball and pocket accelerometer operably connected to a yes/no switch, and a trigger configured to trigger deployment via the deployment module.

In yet another embodiment, a net deployment method comprises forming at least one cupboard in a ceiling of a vehicle; storing at least one net in the cupboard; identifying a state requiring deployment of the net with at least one detection module; and deploying the at least one net when the state requiring deployment of the net is positive with at least one deployment module.

The method further comprises attaching at least one weight to each of the at least one net and propelling the at least one net with at least one explosive charge affixed to each of the at least one net.

In another embodiment, the method comprises deploying the at least one net to create a passable aisle to an exit of the vehicle.

In another embodiment of the method, the vehicle comprises at least one of a car, a truck, a bus, a school bus, a public transit bus, a train, a trolley, and a subway car. The method can include triggering deployment of the at least one net with a trigger provided with the deployment module.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A vehicle safety system comprising:
   at least one cupboard formed in a ceiling of a vehicle;
   at least one net stored in said cupboard;
   at least one detection module configured to identify a state requiring deployment of said net; and
   at least one deployment module configured to deploy said at least one net when said state requiring deployment of said net is positive, said deployment module further comprising:
   at least one charge tube configured in said at least one cupboard;
   at least one weight in said charge tube, said weight being connected to said at least one net;
   at least one explosive charge connected to said weight; and
   a fastening member fixed to said at least one weight with a counterpart fastening member fixed to said vehicle wherein contact between said fastening member and said counterpart fastening member holds said net in place.

2. The system of claim 1 wherein said at least one weight attached to each of said at least one net weighs less than one pound.

3. The system of claim 1 wherein said at least one charge tube is positioned to deploy said at least one weight along a chosen trajectory.

4. The system of claim 1 wherein said at least one net comprises a plurality of nets said plurality of nets arranged in a plurality of cupboards wherein said plurality of cupboards are configured in said ceiling of said vehicle such that said deployment of said plurality of nets separates each of at least one seat in said vehicle from every other of said at least one seat in said vehicle.

5. The system of claim 4 wherein said plurality of cupboards are configured in said ceiling of said vehicle such that said deployment of said plurality of nets catches a plurality of loose cargo in said vehicle and creates a passable aisle to an exit of said vehicle.

6. The system of claim 1 wherein said vehicle comprises at least one of:
   a car;
   a truck;
   a bus;
   a school bus;
   a public transit bus;
   a train;
   a trolley; and
   a subway car.

7. The system of claim 1 wherein said detection module comprises a ball and pocket accelerometer operably connected to a yes/no switch; and
    a trigger configured to trigger deployment via said deployment module.

8. A vehicle safety apparatus comprising:
at least one cupboard formed in a ceiling of a vehicle;
at least one net stored in said cupboard;
at least one detection module configured to identify a state requiring deployment of said net; and
at least one deployment module configured to deploy said at least one net when said state requiring deployment of said net is positive, said deployment module further comprising:
    at least one charge tube configured in said at east one cupboard;
    at least one weight in said charge tube, said weight being connected to said at least one net,
    at least one explosive charge connected to said weight; and
    a fastening member fixed to said at least one weight with a counterpart fastening member fixed to said vehicle wherein contact between said fastening member and said counterpart fastening member holds said net in place.

9. The apparatus of claim 8 wherein said at least one weight attached to each of said at least one net weighs less than one pound.

10. The apparatus of claim 8 wherein said at least one charge tube is positioned to deploy said at least one weight along a chosen trajectory.

11. The apparatus of claim 8 wherein said at least one net comprises a plurality of nets said plurality of nets arranged in a plurality of cupboards wherein said plurality of cupboards are configured in said ceiling of said vehicle such that said deployment of said plurality of nets separates each of at least one seat in said vehicle from every other of said at least one seat in said vehicle.

12. The apparatus of claim 11 wherein said plurality of cupboards are configured in said ceiling of said vehicle such that said deployment of said plurality of nets catches a plurality of loose cargo in said vehicle and creates a passable aisle to an exit of said vehicle.

13. The apparatus of claim 8 wherein said vehicle comprises at least one of:
    a car;
    a truck;
    a bus;
    a school bus;
    a public transit bus;
    a train;
    a trolley; and
    a subway car.

14. The apparatus of claim 8 wherein said detection module comprises a ball and pocket accelerometer operably connected to a yes/no switch; and
    a trigger configured to trigger deployment via said deployment module.

15. A net deployment method comprising:
forming at least one cupboard in a ceiling of a vehicle;
storing at least one net in said cupboard;
identifying a state requiring deployment of said net with at least one detection module; and
deploying said at least one net when said state requiring deployment of said net is positive with at least one deployment module, said deployment module further comprising:
    at least one charge tube configured in said at least one cupboard:
    at least one weight in said charge tube. said weight being connected to said at least one net,
    at least one explosive charge connected to said weight; and
    holding said net in place with a fastening member fixed to said at least one weight and a counterpart fastening member fixed to said vehicle wherein contact between said fastening member and said counterpart fastening member holds said net in place.

16. The method of claim 15 wherein said at least one weight attached to each of said at least one net weighs less than one pound.

17. The method of claim 15 further comprising:
positioning said at least one charge tube to propel said at least one weight attached to said at least one net along a chosen trajectory.

18. The method of claim 15 further comprising
deploying said at least one net to catch a plurality of loose cargo in said vehicle and create a passable aisle to an exit of said vehicle.

19. The method of claim 15 wherein said vehicle comprises at least one of:
    a car;
    a truck;
    a bus;
    a school bus;
    a public transit bus;
    a train;
    a trolley; and
    a subway car.

20. The method of claim 1 further comprising:
triggering deployment of said at least one net with a trigger provided with said deployment module.

* * * * *